Nov. 11, 1941.  A. L. STONE  2,262,212

METHOD OF MAKING COMPOSITE TOOL JOINT MEMBERS AND THE LIKE

Filed March 20, 1940  2 Sheets-Sheet 1

Inventor
Albert L. Stone.

Batchelor + Scantlebury

Attorneys.

Nov. 11, 1941.  A. L. STONE  2,262,212
METHOD OF MAKING COMPOSITE TOOL JOINT MEMBERS AND THE LIKE
Filed March 20, 1940  2 Sheets-Sheet 2

Inventor
Albert L. Stone.

Batchelor & Scantlebury
Attorneys.

Patented Nov. 11, 1941

2,262,212

UNITED STATES PATENT OFFICE 2,262,212

METHOD OF MAKING COMPOSITE TOOL JOINT MEMBERS AND THE LIKE

Albert L. Stone, Palos Verdes Estates, Calif., assignor to Hydril Company, Los Angeles, Calif., a corporation of Nevada Application March 20, 1940, Serial No. 325,015

7 Claims. (Cl. 29—148.2)

This invention relates generally to methods of making composite tubular members consisting of a metal core with which a metal sleeve is weld-integrated.

The method is particularly adapted to the making of composite tool-joint pin members for drill pipe and I will therefore illustrate and describe the method as so applied, but this is not to be construed as limitative on the invention considered in its broader aspects.

In my copending application entitled "Tool joints for well pipe," filed March 18, 1940, Ser. No. 324,547, I have illustrated a number of forms of composite tool joints and have discussed at some length the advantages possessed by such devices and the serious problems they have solved. I have there pointed out that the compositing may be done by adding a sleeve to a new or used tool joint which was originally a one-piece member, or to an original under-size core. The present method may be applied to either of these situations.

One form of composite joint shown in that application involves the securement of the sleeve by welding in from the opposite ends of the sleeve, the weld extending longitudinally of the joint beneath the outer peripheral face of the sleeve, and the exposed end of the weld being later machined to form a part, at least, of the load-taking shoulder or seat at the base end of the threaded portion of the joint. The present method is especially well adapted to the manufacture of that type of composite joint.

By this method of compositing, it is assured that the sleeve and core are not only weld-integrated in a manner to prevent separative movement under the terrific stresses and strains of tension and torque to which tool-joints are exposed, but also that the shoulder at the sleeve-terminal is capable of assuming its vitally important duties without liability of failure. Further, this type of end-penetration weld may be accomplished without disturbing the outer peripheral face of the sleeve and, due to its relatively deep penetration longitudinally of the core and sleeve, ordinarily obviates the necessity of welds at points along the joint intermediate the end welds.

Other objects and features of novelty will be made apparent in the following detailed description, reference being had to the accompanying drawings, in which.

As stated at the outset, I have illustrated and will describe the invention as applied to the making of composite tool-joint members to which use the invention is particularly well adapted, though this choice for illustrative purposes is not to be construed as limitative on such claims as do not specifically call for tool-joint characteristics.

Figure 1:
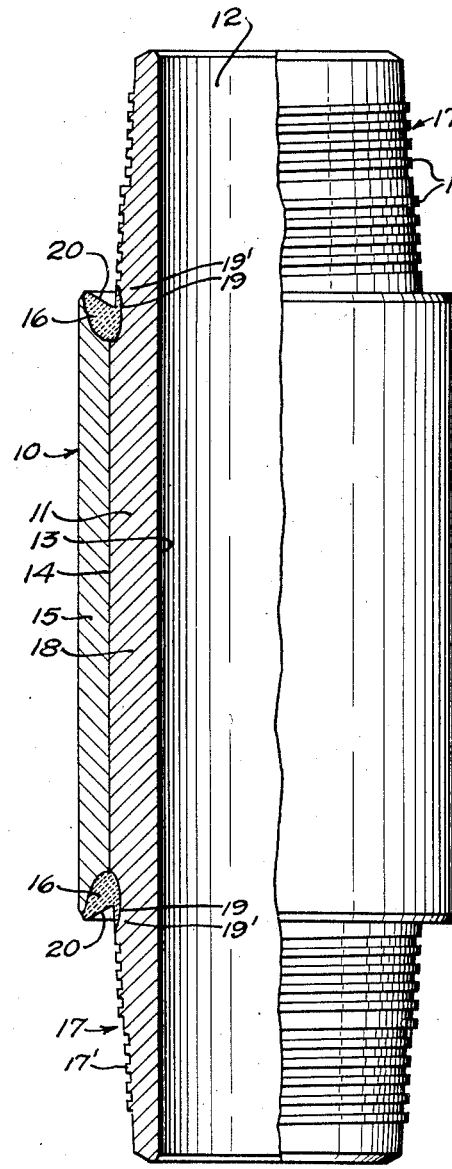
Fig. 1 is an elevation, partly in broken-away, medial section of a composite tool joint pin member made in accordance with the invention.
Figure 4:
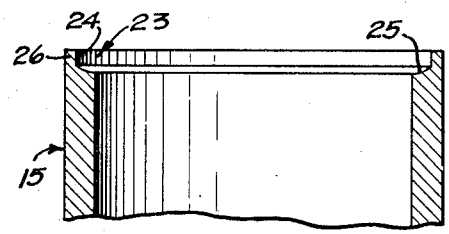
Fig. 4 is a fragmentary section of one end of the sleeve showing one step in preparing it for application to the core.

In Fig. 1 I have illustrated a composite tool joint pin member 10 made in accordance with the invention. The core 11 is here shown as tubular, the defining wall of bore 12 being indicated at 13 and the outer peripheral face being indicated at 14. Sleeve 15 is weld-integrated at its opposite ends to core 11, the welds being indicated at 16. Core 11 has reduced-diameter, threaded portions 17 at each of its ends, and I will term the central, relatively large-diameter portion of the core between the threaded portions, as body portion 18. It will be seen that welds 16 occur at the base ends 19' of threaded pin-portions 17 and actually penetrate said base ends at 19, so the sleeve 15 is weld integrated both to the body portion and threaded pin-portions. Conical end shoulders 20 are cut in welds 16 and so much of the sleeve ends as may be exposed.

The threads 17' on portions 17 are preferably of the quick make-and-break type, here being shown as having two-step characteristics and, as pointed out in Patent No. 1,932,427 to Fred Stone, October 31, 1933, these threads have a particular relationship to shoulders 20, though this is not limitative on the present invention.

By making up core 11 and sleeve 15 separately, it is possible to select the particular alloys which will best suit the purposes of the individual elements, and to heat-treat them individually in the manner best suited to the individual stresses and strains they are called upon to resist. For instance, the threaded portions 17 must have considerably greater "fatigue strength" than the sleeve. The sleeve, on the other hand, must be harder than the threaded portions 17. It need not be as tough as the pin ends, but must be sufficiently tough to stand up under the wear and impact abuses to which it is exposed under both drilling and make-and-break conditions.

While this is not limitative on the invention, I have found that the core may advantageously be made of a carbon steel alloy containing nickel and chromium, while the sleeve may be of a wear and abrasive resistant material such as chrome-molybdenum steel, S. A. E. 4140, and the weld material may be similar to the sleeve material.

In the aforementioned application, I have pointed out other impelling reasons for adoption of composite joint members and have outlined more fully the need for especially effective weld-integration between core and sleeve. Therefore, these points need not be repeated here, except to say that the instant method allows the fulfillment of the demands spoken of in that application.

Threaded portions 17 may be cut down to finished diameter and threads 17' formed either prior to or after the application of sleeve 15. Or, when the application of the sleeve is in the nature of a reconditioning of a used joint or in the building-up of a previously made but unused complete one-piece pin member, threaded portions 17 will be completely formed before the application of the sleeve. All these different conditions have been set forth in detail in the aforementioned application, and it will be understood the instant method will apply in all those situations. However, merely for illustrative purposes and not as limitative on the invention, I have chosen to assume that the sleeve is to be weld-integrated with the core while the latter is still in the form of a tube of uniform thickness throughout its longitudinal extent.

Figures 3, 8:
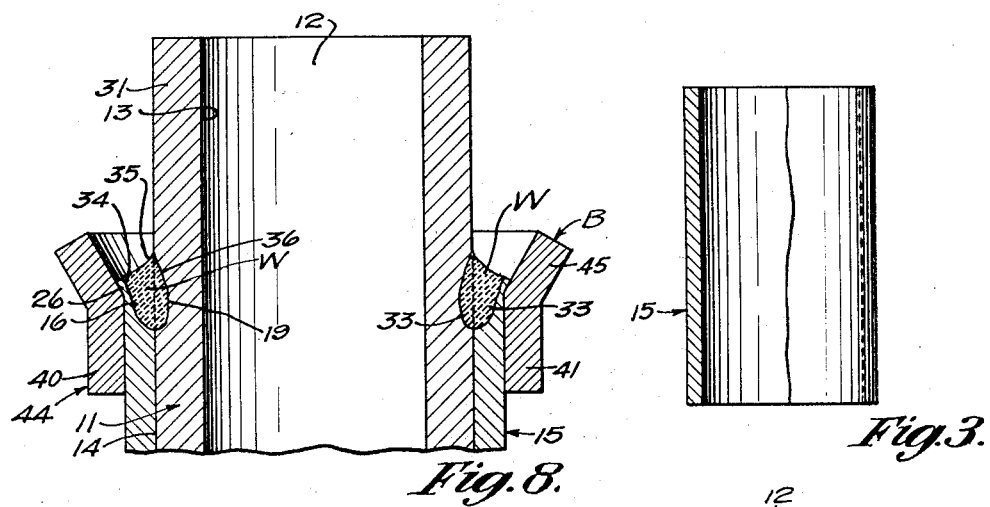
Fig. 3 is a reduced-scale elevation, partly in section, of a sleeve element prior to its application to the core of Fig. 2.
Fig. 8 is a view similar to Fig. 6, but showing the weld as completed.
Figures 2, 9:
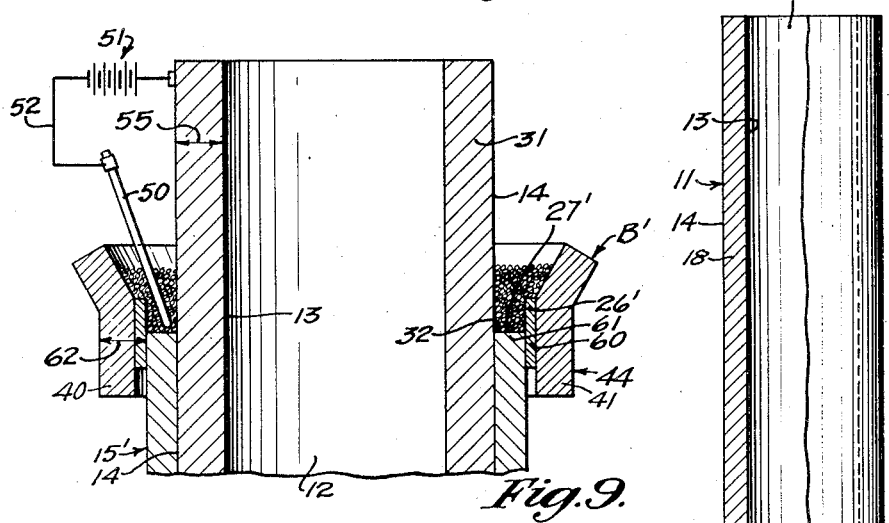
Fig. 2 is a reduced-scale elevation, partly in section, of a core element prior to its assembly with a sleeve element.
Fig. 9 is a section showing a variational form of sleeve-lip as formed preparatory to the welding step.

Thus, I have shown core 11 in Fig. 2 as being a relatively thick-walled tube, while sleeve 15 is shown in Fig. 3 as a shorter tube having thinner walls than core 11. For instance, the wall-thickness of the sleeve may be about two-thirds that of the core. The outside diameter of the core and the inside diameter of the sleeve are so related that the sleeve may be press-fitted or shrunk on the core. From this point on I will describe the procedure as directed to one end, only, of the composite joint member, it being understood that the same steps are carried out at both ends of the member.

The end of sleeve 15 is first counterbored as at 23, giving the effect of a cylindrical bore-portion 24 and a slightly arcuate bottom wall or annular shoulder 25. This leaves an upstanding annular lip 26 which is preferably somewhat less than one-half the thickness of the body portion of the sleeve wall.

Figure 5:
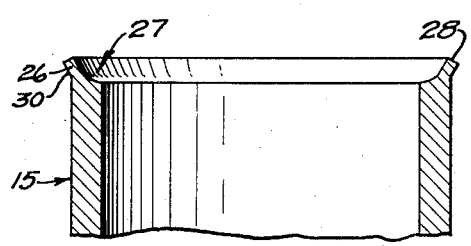
Fig. 5 is a view similar to Fig. 2, but showing the next step in preparing the sleeve.

Lip 26 is then belled out as in Fig. 5 so, in effect, it inclines outwardly and upwardly at the upper end of the sleeve and defines a cup-shaped, annular groove 27 whose upper defining edge 28 is represented by the upper, inner edge of the deformed lip 26. It will be seen that annular edge 28 is only slightly less in diameter than the outer peripheral face of the body portion of the sleeve, while the outer face 30 of the lip overhangs said outer peripheral face, angling or tapering upwardly and outwardly therefrom.

The sleeve 15 is then shrunk or press-fitted on core 11, being positioned endwise so as to leave at each end of the core an un-sleeved portion 31 of correct length later to form threaded portions 17.

Figure 6:
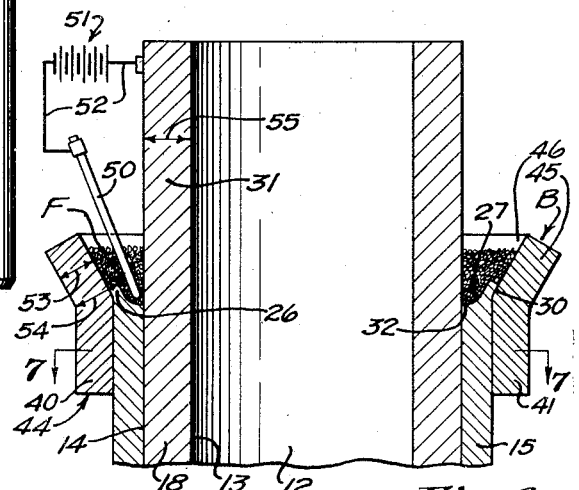
Fig. 6 is a fragmentary section of one end of the core with the sleeve applied thereto, and illustrating the welding step.
Figure 7:
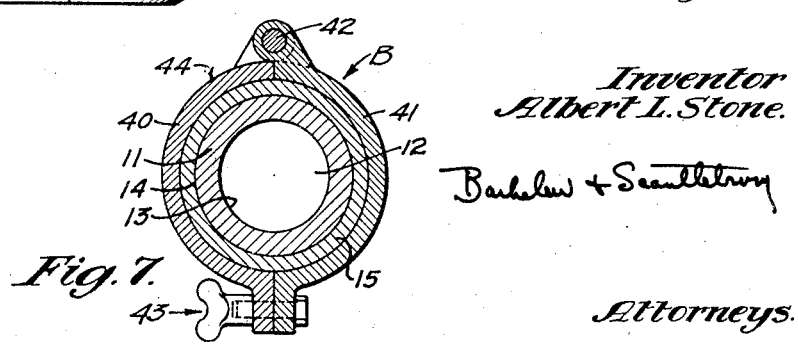
Fig. 7 is a reduced section on line 7—7 of Fig. 6.

With the sleeve fitted to the core as in Fig. 6, and with the assembly in erect position, it will be seen that groove 27 is now inwardly defined by the peripheral face 14 of the core and thus represents an upwardly opening, annular pocket whose inner bottom edge 32 is at the junction of the core and sleeve. Weld material W is now deposited in pocket 27 and caused to penetrate the core and sleeve along both sides of the upper areas of their surfaces of peripheral contact, as at 33 in Fig. 8. The pocket is filled with weld material, causing it to penetrate lip 26 as at 34 and is brought upwardly along the core as at 35 so it penetrates radially into the core at a point 36 above the upper end of the lip and thus into a core-area which later is to become the base end 19' of threaded portion 17 (Fig. 1). The number and speed of welding passes, will depend on the size of the composite joint member, the depth of weld-penetration desired for any given job, the character of the weld material, the particular alloys used for the sleeve and core, etc. In this manner, the weld W penetrates the core and sleeve to a considerable extent, measured both radially and longitudinally of these elements, weld integrating them solidly and firmly and yet not breaking through the outer peripheral face of the sleeve.

By turning the composite member end-for-end and repeating the above described steps at the now-upper end, it will be seen that the sleeve and core are weld-integrated in a manner to resist severe relative displacement stresses and strains to which the member will later be exposed in service. At the same time, the completely annular and longitudinally deep welds at opposite ends of the sleeve not only form shoulders 20 which are well adapted to take the duties to be undertaken thereby, but will effectively resist the tendency of fluid to enter between core and sleeve at these points.

Now any suitable type of flame or electric welding method may be employed for effecting the described welds, but in any event, it will be seen that pocket 27 serves as a convenient means for retaining flux F during the welding operation. The pocket also serves as a retainer to prevent the molten metal from escaping during the welding operation, holding the metal concentrated at the proper points as the welding proceeds.

Preferably, however, a detachable flux basket B is also provided, this basket forming, in effect, a continuation of lip 26 to enlarge the flux holding capacity of the pocket. The basket is made in any convenient form, for instance it may consist of two sections 40, 41 hingedly connected at 42 and adapted to be clamped in a position of encirclement about sleeve 15 by clamp 43. The basket, considered as a whole, consists of an annular band portion 44 fitting about the sleeve, proper, and a conical or upwardly flaring section 45 whose upper, conical face 46 extends in snug contact with the complementary, underface 30 of lip 26, and then projects upwardly a sufficient distance to provide an ample flux-receptacle.

Now it will be seen that the upper and inner portion of lip 26 and the adjacent weld material are to form shoulders 20, and, as has been made apparent, this shoulder is to be a critical part of the completed joint member. It follows that the weld must be absolutely sound at this point and precautions must be taken to prevent the relatively thin lip from burning through. It will be seen that basket section 45 acts as a back-up ring to accomplish the desired end. This is especially important when an electric welding method is being used, as represented conventionally by electrode 50, source of welding current 51, and welding circuit 52, where it is found that the current tends to "short circuit" and burn through any relatively thin parts. Such thin parts are here represented by lips 26, but by backing up the lips by ring section 45, said lips are, in effect, thickened to an extent which prevents such short-circuiting and consequent burning. Therefore it is preferably, though not always essential, that basket-sections or back-up rings 45 have such thickness 53 that the total ring and lip thickness 54 is approximately equal to the thickness 55 of core 11.

After the welds of both ends are completed, as in Fig. 8, the combination flux basket and back-up ring B is removed, and lips 26 are peripherally turned down to render the sleeve of uniform outside diameter from end to end. Shoulder 20 is then cut in the end face of the weld and, if there is an end of the sleeve exposed in the shoulder area, in the sleeve. Threaded portions 17 are formed as shown in Fig. 1. Of course, the order of threading and shouldering operations may be reversed, or in case the core is already threaded, only the shouldering operation has to be performed.

Figures 10, 11:
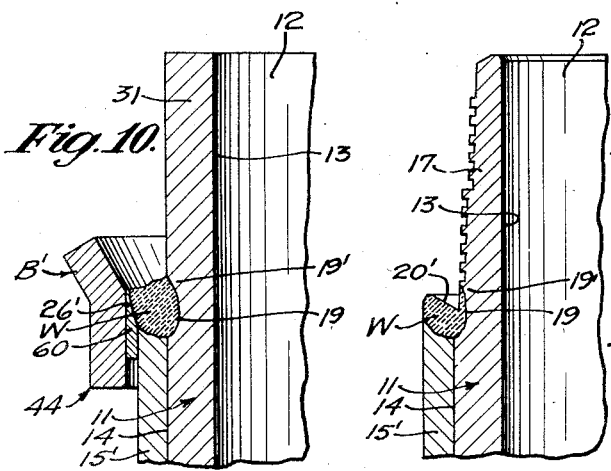
Fig. 10 is a fragmentary section similar to one side of Fig. 9, but showing the welding step completed.
Fig. 11 is a view similar to Fig. 10 but with the shoulder at the weld-juncture faced off.

In Figs. 9, 10 and 11, I have illustrated a slight variation. In this case the sleeve 15' is originally shorter than sleeve 15, lip 26' here being formed by tightly fitting a steel ring 60 to the end of the sleeve. Lip 26' is represented by the portion of the ring which extends beyond the end of the sleeve, proper, and groove or pocket 27' is defined annularly by lip 26' and core 11, and is defined at its bottom by the upper end 61 of the sleeve, proper. The pocket serves the same purpose as pocket 27.

In this case the band portion 44 of the flux basket B' serves as the back-up ring for snugly fitting lip 26', the over-all thickness 62 of lip and band preferably being made approximately equal to core-thickness 55 for the same reasons as given in connection with basket B and lip 26.

The welding will proceed in the same manner as that previously described, the weld material W weld-integrating the core, sleeve and lip and extending through substantially the same areas in the sleeve and core as set forth in that previous description. However, the completed weld (Fig. 10) will extend radially outwardly beyond the outer periphery of the sleeve, proper, because the weld has extended into lip 26' and that lip is on the outside of the sleeve body. Consequently, when the joint is finished up (Fig. 11) as described in connection with the earlier figures, shoulder 20' will lie wholly in and be wholly backed up by weld material, except for such sleeve material as may have melted into the weld material.

From all that has gone before, it will be seen that the completed, composite joint member, as represented by Fig. 1, will be capable of withstanding exceedingly high stresses and strains of tension and torque which, during drilling and make-and-break operations, are constantly tending to set up relative movement between the core and sleeve and rupture the bond.

While I have described preferred embodiments of my invention, it will be realized that certain variations and changes in order of the steps may be made without departing from the spirit and scope of the appended claims.

I claim:

1. The method of attaching a sleeve to a substantially vertically arranged core that includes forming an upstanding annular lip at one end of the sleeve to define an annular upwardly-opening groove about the outer periphery of the core, externally backing up the lip with a removable metal ring, depositing weld material in said groove and causing it to penetrate the core and sleeve along their original faces of contact below said groove, and filling said groove with weld material and thus weld-integrating the lip, core and sleeve.

2. The method of attaching a sleeve to a substantially vertically arranged tubular core that includes forming an upstanding annular lip at one end of the sleeve to define an annular upwardly-opening groove about the outer periphery of the core, externally backing up the lip with a removable metal ring of such thickness that the total thickness of lip and ring is approximately equal to the wall-thickness of the core, depositing weld material in said groove and causing it to penetrate the core and sleeve along their original faces of contact below said groove, and filling said groove with weld material and thus weld-integrating the lip, core and sleeve.

3. The method of making a composite tubular member embodying a core and a sleeve about the core, that includes preparing the sleeve by affixing a ring about its end with an end of the ring projecting beyond the end of the sleeve to provide a lip thereabout, tightly fitting the sleeve to the core with an end of the core projecting beyond the end of the sleeve to define, with said lip, an annular groove opening endwise of the core and sleeve, depositing weld material in said groove and causing it to penetrate the core and sleeve along their original faces of contact adjacent the groove, and filling said groove with weld material and thus weld-integrating the lip, core and sleeve.

4. The method of making a composite tool-joint pin member embodying a tubular core of given length and a shorter sleeve applied about the core with the sleeve ends spaced from the core-ends, that includes forming longitudinally projecting annular lips at the opposite ends of the sleeve to define endwise-opening grooves about the outer periphery of the core, depositing weld-material in said grooves and causing it to penetrate the core and sleeve along their original faces of contact adjacent said grooves, filling said grooves with weld material and thus weld-integrating the lips, core and sleeve, and cutting down the exposed ends of the weld material to provide annular shoulders facing towards the respective ends of the core.

5. The method of making a composite tool-joint pin member embodying a tubular core of given length and a shorter sleeve applied about the core with the sleeve ends spaced from the core-ends, that includes forming longitudinally and radially projecting annular lips at the opposite ends of the sleeve to define endwise-opening grooves about the outer periphery of the core, depositing weld-material in said grooves and causing it to penetrate the core and sleeve along their original faces of contact adjacent said grooves, filling said grooves with weld material and thus weld-integrating the lips, core and sleeve, externally cutting down the lips to render the sleeve of substantially uniform outside diameter from end to end, and cutting down the exposed ends of the weld material to provide annular shoulders facing towards the respective ends of the core.

6. The method of making a composite tool-joint pin member embodying a core and a sleeve applied about the core with one end of the core projecting axially beyond the associated end of the sleeve; that includes forming an axially projecting annular lip at said associated end of the sleeve to define an endwise-opening groove about the outer periphery of the core, depositing weld-material in said groove and causing it to penetrate the core and sleeve along their original faces of contact adjacent said groove, filling said groove with weld material and thus integrating the lip, core and sleeve, and cutting down the exposed end of the weld material to provide an annular shoulder facing towards said one end of the core.

7. The method of making a composite tool-joint pin member embodying a core and a sleeve applied about the core with one end of the core projecting axially beyond the associated end of the sleeve; that includes forming an axially and radially projecting annular lip at said associated end of the sleeve to define an endwise-opening groove about the outer periphery of the core, depositing weld-material in said groove and causing it to penetrate the core and sleeve along their original faces of contact adjacent said groove, filling said groove with weld material and thus integrating the lip, core and sleeve, externally cutting down the lip to reduce its outside diameter, and cutting down the exposed end of the weld material to provide an annular shoulder facing towards said one end of the core.

ALBERT L. STONE.